United States Patent
Mohapatra

(10) Patent No.: US 12,175,574 B2
(45) Date of Patent: Dec. 24, 2024

(54) IMAGE CREATION WITH POSITIONING OF RECREATED TEXT AND SHAPES

(71) Applicant: International Business Machines Corporation, Armonk, NY (US)

(72) Inventor: Bibhudatta Mohapatra, Thanisandra (IN)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 18/045,204

(22) Filed: Oct. 10, 2022

(65) Prior Publication Data
US 2024/0119651 A1  Apr. 11, 2024

(51) Int. Cl.
*G06T 11/60* (2006.01)
*G06V 30/10* (2022.01)

(52) U.S. Cl.
CPC .............. *G06T 11/60* (2013.01); *G06V 30/10* (2022.01)

(58) Field of Classification Search
CPC ...................................................... G06T 11/60
See application file for complete search history.

(56) References Cited

U.S. PATENT DOCUMENTS

| | | | | |
|---|---|---|---|---|
| 2008/0024501 A1* | 1/2008 | Yamakado | ............ | G06F 40/166 345/443 |
| 2009/0016605 A1 | 1/2009 | Chao et al. | | |
| 2010/0107101 A1* | 4/2010 | Shaw | .................... | G06F 3/0481 715/766 |
| 2011/0110599 A1 | 5/2011 | Sata et al. | | |
| 2011/0293183 A1 | 12/2011 | Tan | | |
| 2015/0378973 A1 | 12/2015 | Korneev | | |
| 2018/0089157 A1* | 3/2018 | Masalovitch | ......... | G06F 40/166 |
| 2020/0104586 A1 | 4/2020 | Takahashi | | |

FOREIGN PATENT DOCUMENTS

| | | |
|---|---|---|
| CN | 108241861 A | 7/2018 |
| CN | 113850068 A | 12/2021 |
| WO | 2010080259 A2 | 7/2010 |

OTHER PUBLICATIONS

PCT International Search Report and Written Opinion, dated Jun. 29, 2023, regarding Application No. PCT/CN2023/093549, 7 pages.

(Continued)

*Primary Examiner* — Shivang I Patel
(74) *Attorney, Agent, or Firm* — Yee & Associates, P.C.

(57) ABSTRACT

A computer implemented method for manipulating an image comprising pixels. A group of processor units creates editable text having changeable text attributes from text in the image. The group of processor units forms a text layer for the image with the editable text created from the text in the image, wherein the editable text is located in text positions in the text layer corresponding to positions of the text in the image. The group of processor units creates a set of editable shapes having changeable shape attributes, wherein the set of editable shapes correspond to a set of shapes in the image. The group of processor units forms a shape layer for the image with the set of editable shapes. The set of editable shapes have a set of shape positions in the shape layer that correspond to a set of positions of the set of shapes in the image.

20 Claims, 13 Drawing Sheets

(56) References Cited

OTHER PUBLICATIONS

Chen et al., "Towards Automated Infographic Design: Deep Learning-based Auto-Extraction of Extensible Timeline," IEEE Transactions on Visualization and Computer Graphics, Aug. 20, 2019, vol. 26, No. 1, pp. 917-926.
Marius, "A table detection, cell recognition and text extraction algorithm to convert tables in images to excel files," Towards Data Science, Feb. 25, 2020, accessible at https://towardsdatascience.com/a-table-detection-cell-recognition-and-text-extraction-algorithm-to-convert-tables-to-excel-files-902edcf289ec, last accessed on Sep. 29, 2022, 15 pages.
Swearngin et al., "Rewire: Interface Design Assistance from Examples," CHI '18: Proceedings of the 2018 CHI Conference on Human Factors in Computing Systems, Apr. 2018, Paper No. 504, pp. 1-12. pp.

\* cited by examiner

IMAGE CREATION WITH POSITIONING OF RECREATED TEXT AND SHAPES

BACKGROUND

1. Field

The disclosure relates generally to an improved computer system and more specifically to a computer implemented method, apparatus, system, and computer program product for positioning text and shapes from images in layers for manipulation.

2. Description of the Related Art

A digital image is an image that is comprised of picture elements. These picture elements are also referred to as pixels. These pixels can have values defining spatial coordinates of the pixels within the image. The spatial coordinates can be denoted using values on an x-axis and a y-axis. Further, pixels can have values for attributes of the pixels such as intensity, color, or gray level. These types of images can also be referred to as rasterized or bitmapped images.

Digital images can be used to present information in software documentation. For example, screen shots can be included in software documentation to show user interfaces and other information to users. In addition to screenshots, digital images can take other forms such as scanned images, photographs, banners, geo-maps, bitmaps for webpages, and other graphical depictions.

SUMMARY

According to one illustrative embodiment, a computer implemented method manipulates an image comprised of pixels. A group of processor units creates editable text from text in the image. The editable text has changeable text attributes. The group of processor units forms a text layer for the image with the editable text. The editable text is located in text positions in the text layer that correspond to positions of the text in the image. The group of processor units creates a set of editable shapes corresponding to a set of shapes in the image, wherein the set of editable shapes has changeable shape attributes. The group of processor units forms a shape layer for the image with the set of editable shapes. The set of editable shapes have a set of shape positions in the shape layer that correspond to a set of positions of the set of shapes in the image. According to other illustrative embodiments, a computer system and a computer program product for manipulating text and a set of shapes are provided.

DETAILED DESCRIPTION

Figure 1:
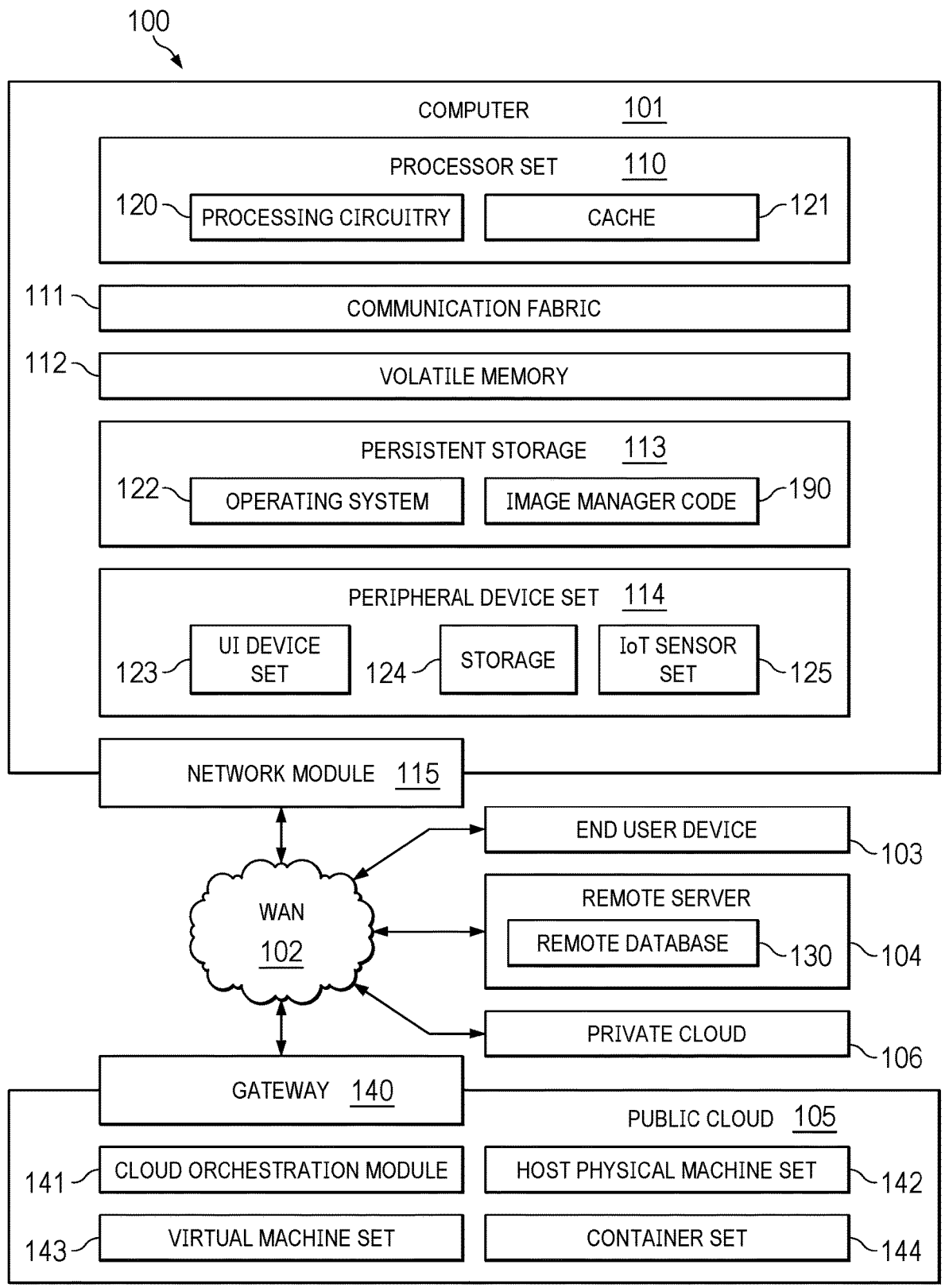
FIG. 1 is a block diagram of a computing environment in which illustrative embodiments can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as image manager code 190. In the illustrative examples, image manager code 190 can be used to images to increase the editability of images. Image manager code 190 can operate to transform images comprising pixels into a form that is easier to edit by a user. In addition to image manager code 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and image manager code 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in image manager code 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in image manager code 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, the illustrative embodiments recognize and take into account that the use of digital images can provide challenges. These challenges can result from digital images being in the form of pixels that reduce the ability to edit or modify the digital images. These challenges can be present with respect to changing technical documents such as software documentation. For example, text and shapes cannot be easily reused or translated. For example, a screenshot of a frame or menu layout cannot be easily edited. Instead, a new screenshot is taken to replace the prior screenshot.

As another example, optical character recognition can be performed on these images. However, optical character recognition cannot easily place text in the correct position in an image for re-creating meaningful graphic content such as instructions for explanations of user interfaces in software.

Further, older images may not have the desired quality for reuse. Older images may have a resolution resulting in those images being hazy or unclear. For example, the resolution of older digital images may be low such that text is not readable. Further, typographical errors, misspelled words, primordial, incorrect meaning, or incorrect labeling remain in the digital images. Text in a photograph, bitmap file, a JPEG file, or PNG file cannot be easily edited in these types of files.

When using these types of files in documentation or other types of content, editing text in these digital images can require much effort in the form of patchwork work on background, colors, and font management. The effort needed can be time-consuming and require experienced users to perform the editing modifications. In a similar fashion, shapes also are not easily modified or changed in these types of files. As a result, the use of these types of files in documentation or other content can make modifying or updating information in documentation or other content more difficult and time-consuming than desired.

The use of optical character recognition does not provide a quick fix or edit capability within graphical tools or editors when editing or managing software documentation. The original visual appearance of the text with other graphics such as shapes is not maintained with a desired level of accuracy.

Thus, in recognizing these and other considerations, the illustrative embodiments provide a computer implemented method, apparatus, system, and computer program product for editing at least one of text and shapes in images. These images are pixel based images. The pixels in these images define the text and shapes in the images. Images containing pixels can also be referred to as digital images, rasterized images, or bitmapped images.

In the illustrative examples, the image can be converted into layers for use in manipulating components such as text and shapes. In one illustrative example, editable text is created from text in the image comprised of pixels. The editable text created from the image has changeable text attributes. A text layer is formed for the image with the editable text. The editable text is located in text positions in the text layer that correspond to positions of the text in the image. A set of editable shapes corresponding to a set of shapes in the image is created. The set of editable shapes have changeable shape attributes. A shape layer is formed for the image with the set of editable shapes. The set of editable shapes have a set of shape positions in the shape layer that correspond to a set of positions of the set of shapes in the image, wherein the text layer and the shape layer are displayed in a graphical user interface in a display system. In this illustrative example, the text layer and the shape layer can be displayed such that these two layers have the same look or visual appearance as the image. Editing of these layers can be performed more easily as compared to pixels in the image.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
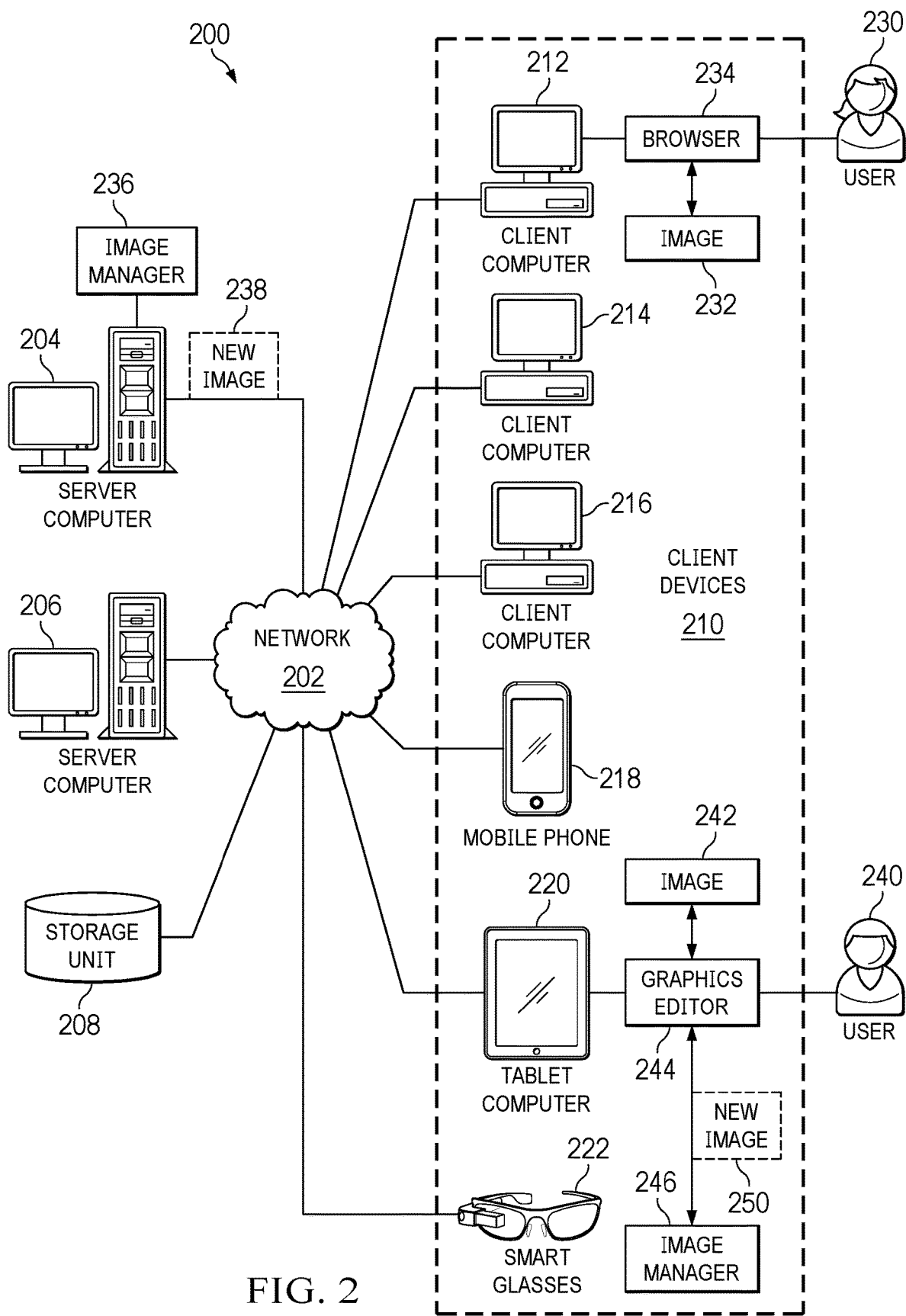
FIG. 2 is a pictorial representation of a network of data processing systems in which illustrative embodiments can be implemented.

With reference now to FIG. 2, a pictorial representation of a network of data processing systems is depicted in which illustrative embodiments may be implemented. Network data processing system 200 is a network of computers in which the illustrative embodiments may be implemented. Network data processing system 200 contains network 202, which is the medium used to provide communications links between various devices and computers connected together within network data processing system 200. Network 202 may include connections, such as wire, wireless communication links, or fiber optic cables.

In the depicted example, server computer 204 and server computer 206 connect to network 202 along with storage unit 208. In addition, client devices 210 connect to network 202. Client devices 210 can be, for example, computers, workstations, or network computers. As depicted, client computer 212, client computer 214, and client computer 216 are examples of client devices 210. Mobile phone 218, tablet computer 220, and smart glasses 222 are additional examples of client devices 210.

In the depicted example, server computer 204 provides information, such as boot files, operating system images, and applications to client devices 210. In this illustrative example, server computer 204, server computer 206, storage unit 208, and client devices 210 are network devices that connect to network 202 and network 202 is the communications media for these network devices. Some or all of client devices 210 may form an Internet of things (IoT) and these devices can connect to network 202 and exchange information with each other over network 202.

Client devices 210 are clients to server computer 204 in this example. Network data processing system 200 may include additional server computers, client computers, and other devices not shown. A number of client devices 210 connect to network 202 utilizing at least one of wired, optical fiber, or wireless connections.

Program instructions located in network data processing system 200 can be stored on a computer-recordable storage media and downloaded to a data processing system or other device for use. For example, program instructions can be stored on a computer-recordable storage media on server computer 204 and downloaded to client devices 210 over network 202 for use on client devices 210.

In the depicted example, network data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 200 also may be implemented using a number of different types of networks. For example, network 202 can be comprised of at least one of the Internet, an intranet, a local area network (LAN), a metropolitan area network (MAN), or a wide area network (WAN). FIG. 2 is intended as an example, and not as an architectural limitation for the different illustrative embodiments.

As depicted, user 230 at client computer 212 manipulates image 232 using browser 234 running on client computer 212. In this example, image 232 is used in software documentation. For example, image 232 can be a screenshot with text describing shapes such as controls or menus in the screenshot. User 230 can edit, update, or change image 232. For example, user 230 can correct a typographical error in text, update text, change the outline of shapes, or perform other manipulations of the text and the shapes.

In this example, both the text and shapes in image 232 are defined by pixels. Image 232 is not easily editable by user 230 in its present form because pixels are used to define the text. User 230 can send image 232 to image manager 236 located in server computer 204. Image manager 236 can process image 232 and generate new image 238, which is in a format that is more easily editable as compared to image 232 and has the same visual appearance as image 232.

In this example, image manager 236 performs optical character recognition on image 232 to recognize text within image 232. In this example, the optical character recognition results in the generation of text data. This text data is machine readable and can be, for example, ASCII codes instead of the pixels used in image 232.

Additionally, image manager 236 determines the positions of the text recognized in image 232. Image manager 236 identifies text attributes for the text recognized in image 232. These text attributes can be, for example, font name, color, style, and other attributes of the text.

In this example, image manager 236 creates a first layer containing the text from image 232. Further, the text in the first layer is located in positions corresponding to the positions of the text in image 232 based on the positions of the text in image 232. The text attributes are associated with the text in the first layer.

As result, the first layer can be displayed such that text has same visual appearance as the text in image 232. The difference is that the text in the first layer is more easily editable than the pixels defining the text in image 232.

Additionally, image manager 236 detects shapes in image 232 and generates shapes that are more easily editable from the shapes detected in image 232. The shapes are defined using shape data such as vector graphics rather than the pixels used in image 232.

Image manager 236 determines the positions of the shapes in image 232. Image manager 236 also identifies shape attributes for the shapes in image 232. These shape attributes can be, for example, a line width, a line style, a line color, a fill color, and other attributes of the shapes.

Image manager 236 creates a second layer containing the shapes. The shapes in the second layer are in positions corresponding to the positions of the shapes in image 232. Further, the shape attributes for the shapes are associated with the shapes in the second layer.

The second layer can be displayed such that the shapes have the same visual appearance as shapes in image 232. Shapes in the second layer are in a format that is machine readable and more easily editable than the pixels defining the shapes in image 232.

In this example, image manager 236 combines the first layer containing the text and the second layer containing the shapes to form new image 238. New image 238 is a form of image 232 that is more easily editable. New image 238 has a visual appearance of image 232 when displayed.

As a result, the text and shapes in new image 238 can be more easily manipulated as compared to manipulating pixels in image 232. For example, shapes defined using vector graphics are easier to edit than shapes defined using pixels. In similar fashion, text defined using ASCII codes are also easier to edit than text defined using pixels.

In other words, new image 238 is a version of image 232 that has a format more suitable for easier editing by user 230 than editing pixels. Further, new image 238 can be reused for future editing.

As another illustrative example, user 240 at tablet computer 220 can manipulate image 242 using a program such as graphics editor 244. In this example, image manager 246 is located in tablet computer 220 and is depicted as a separate component from graphics editor 244. In other illustrative examples, image manager 246 can be part of graphics editor 244.

Image manager 246 can operate to convert image 242 having a pixel format to new image 250 having a format that is more easily editable by user 240 using graphics editor 244. In this depicted example, image manager 246 identifies text and shapes from the pixels in image 242. Additionally, image manager 246 determines positions for the text and shapes in image 242. Image manager also identifies text attributes for the text and shape attributes for the shapes in image 242.

Image manager 246 creates a first layer for the text and a second layer for the shapes from image 242. In this illustrative example, the positioning of the text in the first layer corresponds to the positions of the text in image 242. The positioning of the shapes in the second layer correspond to the positions of the shapes in image 242. Further, the text attributes are associated with the text in the first layer and the shape attributes are associated with the shapes in the second layer such that the display of these layers provides the same visual appearance for these elements as in image 242.

In this illustrative example, user 240 can edit text in the first layer and the shapes in the second layer in new image 250 independently of each other. In other illustrative examples, these two layers can be combined into one layer in new image 250. New image 250 can be edited by user 240 using graphics editor 244. Further, new image 250 is reusable for improvising, correcting, or translating content found in image 242.

Thus, the use of layers for text and shapes in this example can aid in image manipulation such as correcting or modifying digital images such as bitmap images. With the layers created in this illustrative example, manipulations can be more easily performed on images for technical graphics, infographics, software screenshots, imaged data tables, flow diagrams, and other types of uses. In the different illustrative examples, the use of the layers can be implemented in graphical tools. This type of capability can increase at least one of the readability or visibility of elements in the digital images by converting the elements such as text and shapes in the digital images into a more easily editable form.

Figure 3:
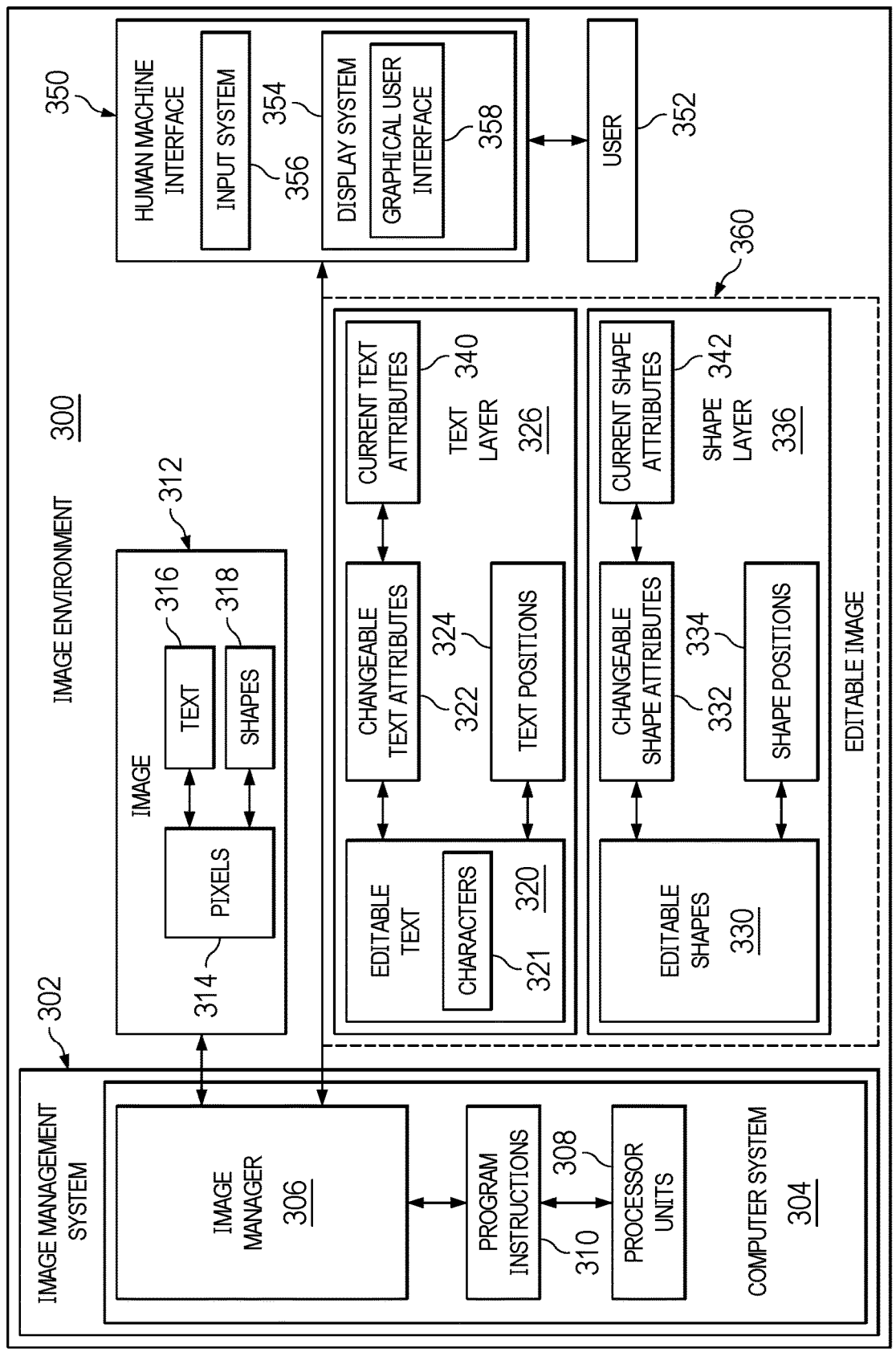
FIG. 3 is a block diagram of an image manipulation environment in accordance with an illustrative embodiment.

With reference now to FIG. 3, a block diagram of an image manipulation environment is depicted in accordance with an illustrative embodiment. In this illustrative example, image environment 300 includes components that can be implemented in hardware such as the hardware shown in network data processing system 200 in FIG. 2.

In this illustrative example, image management system 302 can operate to manage images in image environment 300. The images can take a number of different forms. For example, the images can be selected from at least one of a screenshot, a scanned image, a photograph, a banner for a webpage, a geo-map, a bitmap, and other graphical depictions.

As depicted, image management system 302 comprises computer system 304 and image manager 306. Image manager 306 is located in computer system 304 and can be implemented in software, hardware, firmware or a combination thereof. Image manager 306 is an example of image manager code 190 in FIG. 1. When software is used, the operations performed by image manager 306 can be implemented in program instructions configured to run on hardware, such as a processor unit.

When firmware is used, the operations performed by image manager 306 can be implemented in program instructions and data and stored in persistent memory to run on a processor unit. When hardware is employed, the hardware can include circuits that operate to perform the operations in image manager 306.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, field programmable array logic, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 304 is a physical hardware system and includes one or more data processing systems. When more than one data processing system is present in computer system 304, those data processing systems are in communication with each other using a communications medium. The communications medium can be a network. The data processing systems can be selected from at least one of a computer, a server computer, a tablet computer, or some other suitable data processing system.

As depicted, computer system 304 includes a group of processor units 308 that are capable of executing program instructions 310 implementing processes in the illustrative examples. As used herein, a "group of" when used with reference to items means one or more items. For example, a group of process units 308 is or more processor units 308. A processor unit in the group of processor units 308 is a hardware device and is comprised of hardware circuits such as those on an integrated circuit that respond and process instructions and program instructions that operate a computer.

When the group of processor units 308 execute program instructions 310 for a process, the group of processor units 308 is one or more processor units that can be on the same computer or on different computers. In other words, the process can be distributed between processor units on the same or different computers in computer system 304. Further, the group of processor units 308 can be of the same type or different type of processor units. For example, the group of processor units 308 can be selected from at least one of a single core processor, a dual-core processor, a multi-processor core, a general-purpose central processing unit (CPU), a graphics processing unit (GPU), a digital signal processor (DSP), or some other type of processor unit.

In this depicted example, image management system 302 can process image 312 to make image 312 more easily editable. As depicted, image 312 is comprised of pixels 314. Text 316 and a set of shapes 318 are present in image 312. As depicted, text 316 and the set of shapes 318 are defined in image 312 using pixels 314. Image 312 can also be referred to as a pixel image, a digital image, or a rasterized image.

Image manager 306 can create editable text 320 from text 316 in image 312. Image manager 306 can analyze pixels 314 to identify text 316 in image 312. For example, image manager 306 can use an optical character recognition process to recognize text 316 from pixels 314 defining text 316 in image 312. Editable text 320 can be, for example, characters 321 described using character encoding formats such as ASCII or other formats or mechanisms other than pixels 314.

Additionally, image manager 306 can identify changeable text attributes 322 from text 316 in image 312 and associate changeable text attributes 322 with editable text 320. Changeable text attributes 322 can take a number of different forms. For example, changeable text attributes 322 can be selected from at least one of one of a font name, style, size, color, bolding, italics, underlining, or other attributes for editable text 320.

These changeable text attributes 322 can be modified to change the appearance of editable text 320. In this depicted example, the appearance can be changed for individual characters or groupings of text such as words or phrases in editable text 320 using changeable text attributes 322.

Further, characters 321 can be changed within editable text 320. In other words, a character in characters 321 can be changed from one character to another character. For example, in the text "halp", "a" can be changed to "e" to obtain the text "help".

In this illustrative example, text positions 324 are also identified for editable text 320. For example, image manager 306 creates text layer 326 with editable text 320 from text 316 in image 312. In this illustrative example, text layer 326 can have the same dimensions as image 312. Editable text 320 is located in text positions 324 in text layer 326 that correspond to positions of text 316 in the image 312.

For example, text positions 324 for editable text 320 can be set to positions corresponding to the positions of text 316 in image 312. In this illustrative example, text layer 326 has the same dimensions as image 312. Text positions 324 in text layer 326 can have coordinates corresponding to the positions of text 316 in pixels 314. The coordinates describing text positions 324 in text layer 326 can be based on the locations of text 316 in the rows and columns of pixels 314 such that text layer 326 can be displayed with editable text 320 having the same visual appearance as text 316 in image 312.

In this illustrative example, image manager 306 can create a set of editable shapes 330 corresponding to a set of shapes 318 in the image 312. In this illustrative example, image manager 306 can use an object recognition process to analyze pixels 314 to identify shapes 318. With the identification of shapes 318, the set of shapes 318 can be used to create editable shapes 330. The set of editable shapes 330 can be described using vector graphics data. For example, editable shapes 330 can be defined in a Cartesian plane with objects such as points, lines, curves, and polygons.

Further, image manager 306 can identify changeable shape attributes 332 from shapes 318 in image 312 and associate changeable shape attributes 332 with the set of editable shapes 330. Changeable shape attributes 332 can take a number of different forms. For example, changeable shape attributes 332 can be selected from at least one of a line width, a line style, a line color, a transparency level, a fill color, a fill pattern, an alignment, or other attributes for the set of editable shapes 330. These attributes can be changed to change the appearance of the set of editable shapes 330. These attributes can be changed for individual shapes in the set of editable shapes 330. Further, the actual shape of an editable shape in editable shapes 330 can also be changed. For example, the length of a rectangle can be lengthened. As another example, a triangle can be manipulated to become a pentagon, octagon, or other shape.

In this illustrative example, shape positions 334 are also identified for the set of editable shapes 330. Image manager 306 creates shape layer 336 using the set of editable shapes 330 created from the set of shapes 318 in image 312. In this illustrative example, shape layer 336 has the same dimensions as image 312. The set of editable shapes 330 is located in a set of shape positions 334 in shape layer 336 that corresponds to positions of the set of shapes 318 in the image 312.

For example, the set of shape positions 334 for the set of editable shapes 330 can be set to positions corresponding to the positions of the set of shapes 318. In this example, shape layer 326 has the same dimensions as image 312. Shape positions 334 can have coordinates corresponding to the positions of shapes 318 in pixels 314. For example, the coordinates describing the set of shape positions 334 in text layer 326 can be based on where the set of shapes 318 is located in the rows and columns of pixels 314 such that shape layer 336 can be displayed with the set of editable shapes 330 having the same visual appearance as the set of shapes 318 in image 312.

In creating text layer 326 and shape layer 336 to have the same visual appearance as image 312, current text attributes 340 can be identified for text 316 based on analysis of pixels 314 defining text 316. Further, current shape attributes 342 can be identified for the set of shapes 318 by analyzing pixels 314 defining shapes 318. The analysis of pixels to identify these current attributes can include analyzing pixel intensity, pixel color, and other attributes of pixels forming defining text 316 and shapes 318.

Changeable text attributes 322 can be set to current text attributes 340, and changeable shape attributes 332 can be set to current shape attributes 342. Using these current attributes in addition to text positions 324 and the set of shape positions 334, editable text 320 in text layer 326 and the set of editable shapes 330 in shape layer 336 can have the same visual appearance as text 316 and shapes 318 in image 312 when displaying these layers. In other words, changeable text attributes 322 have initial values such that editable text 320 have a visual appearance of text 316 in image 312 and changeable shape attributes 332 have initial values such that the set of editable shapes 330 has the visual appearance of the set of shapes 318 in image 312.

In this illustrative example, text layer 326 and shape layer 336 can be displayed on human machine interface 350 to user 352. As depicted, human machine interface 350 comprises display system 354 and input system 356.

Display system 354 is a physical hardware system and includes one or more display devices on which graphical user interface 358 can be displayed. The display devices can include at least one of a light emitting diode (LED) display, a liquid crystal display (LCD), an organic light emitting diode (OLED) display, a computer monitor, a projector, a flat panel display, a heads-up display (HUD), a head-mounted display (HMD), or some other suitable device that can output information for the visual presentation of information.

As depicted, text layer 326 and shape layer 336 can be displayed in graphical user interface 358 on display system 354 to user 352. User 352 is a person that can interact with graphical user interface 358 through user input generated by input system 356. Input system 356 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

In this manner, user 352 can edit editable text 320 in text layer 326 and set of editable shapes 330 in shape layer 336 more easily than editing text 316 and shapes 318 defined by pixels 314 in image 312. In this illustrative example, text layer 326 can be overlaid on shape layer 336 or shape layer 336 can be overlaid on text layer 326 in graphical user interface 358 to provide the visual appearance of image 312.

With the display of these layers in graphical user interface 358, user 352 can select one of these layers to edit the elements in the layers. For example, user 352 can select text layer 326 and edit editable text 320. In another illustrative example, user 352 can select shape layer 336 and edit the set of editable shapes 330.

This editing of editable text 320 can include changing characters 321 in editable text 320 to correct typos, update editable text 320, add new content, make a translation of editable text 320 into another language, or perform other changes. Further, the editing can include changing changeable text attributes 322 such as font size, color, or other changeable text attributes 322 for editable text 320.

The editing performed by user 352 can also include changing editable shapes 330. For example, shapes can be added to editable shapes 330, shapes can be removed from editable shapes 330, editable shapes 330 can be modified, or some combination thereof. Further, the appearance of editable shapes 330 can be changed by changing changeable shape attributes 332. For example, line thicknesses may be increased, colors can be changed, or other changeable shape attributes can be changed.

In this illustrative example, these two layers can form editable image 360. Editable image 360 is a new image that can be displayed in graphical user interface 358 in display system 354. Further, in this example, the two layers can be separate from each other. These two layers can be displayed overlaid on each other, one at a time, or in some other fashion.

In another illustrative example, image manager 306 can combine text layer 326 and shape layer 336 to form editable image 360. In this example, only a single layer is present after combining these two layers.

Thus, image manager 306 can create editable text 320 and editable shapes 330 in place of those elements in text layer 326 and shape layer 336 in the corresponding positions in these layers that result in editable image 360 having the same visual appearance as image 312. Further, the identification of changeable text attributes 322 for editable text 320 and changeable shape attributes 332 for editable shapes 330 are used to obtain the same visual appearance between editable image 360 and image 312. Additionally, image manager 306 creates editable text 320 with changeable text attributes 322 in a form that can be more easily manipulated as compared to the same text in text 316 defined by pixels 314 in image 312. Image manager 306 creates editable shapes 330 in a form that can be more easily manipulated compared to the corresponding shapes and shapes 318 defined by pixels 314 in image 312.

Computer system 304 can be configured to perform at least one of the steps, operations, or actions described in the different illustrative examples using software, hardware, firmware or a combination thereof. As a result, computer system 304 operates using image manager 306 that enables manipulating text and shapes with less effort as compared to manipulating text and shapes in an image comprised of pixels.

In the illustrative example, the use of image manager 306 in computer system 304 integrates processes into a practical application for enabling a user to manipulate an image. In this illustrative example, image manager 306 is a tool that can transform image from a pixel form into another form that allows for easier editing.

For example, the text and shapes defined by pixels in an image can be transformed into computer readable text and shapes. The computer readable text can be, for example, text represented by ASCII code. This type of representation of text can enable easier editing of the text using a graphic tool or application as compared to editing the same text represented as pixels. As another example, shapes can be represented using vector graphics data rather than in the form of pixels.

The illustration of image environment 300 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more layers can be present in addition to text layer 326 and shape layer 336. For example, an additional shape layer can be present and the editable shapes placed into these two shape layers can be based on various criteria such as type of shape, shape position, shape color, or other criteria. As another example, another text layer can be present. With two text layers, editable text can be placed into these layers using on different criteria. For example, editable text located within shapes can be placed into one text layer while editable text located outside of shapes can be placed into another text layer.

Figure 4:
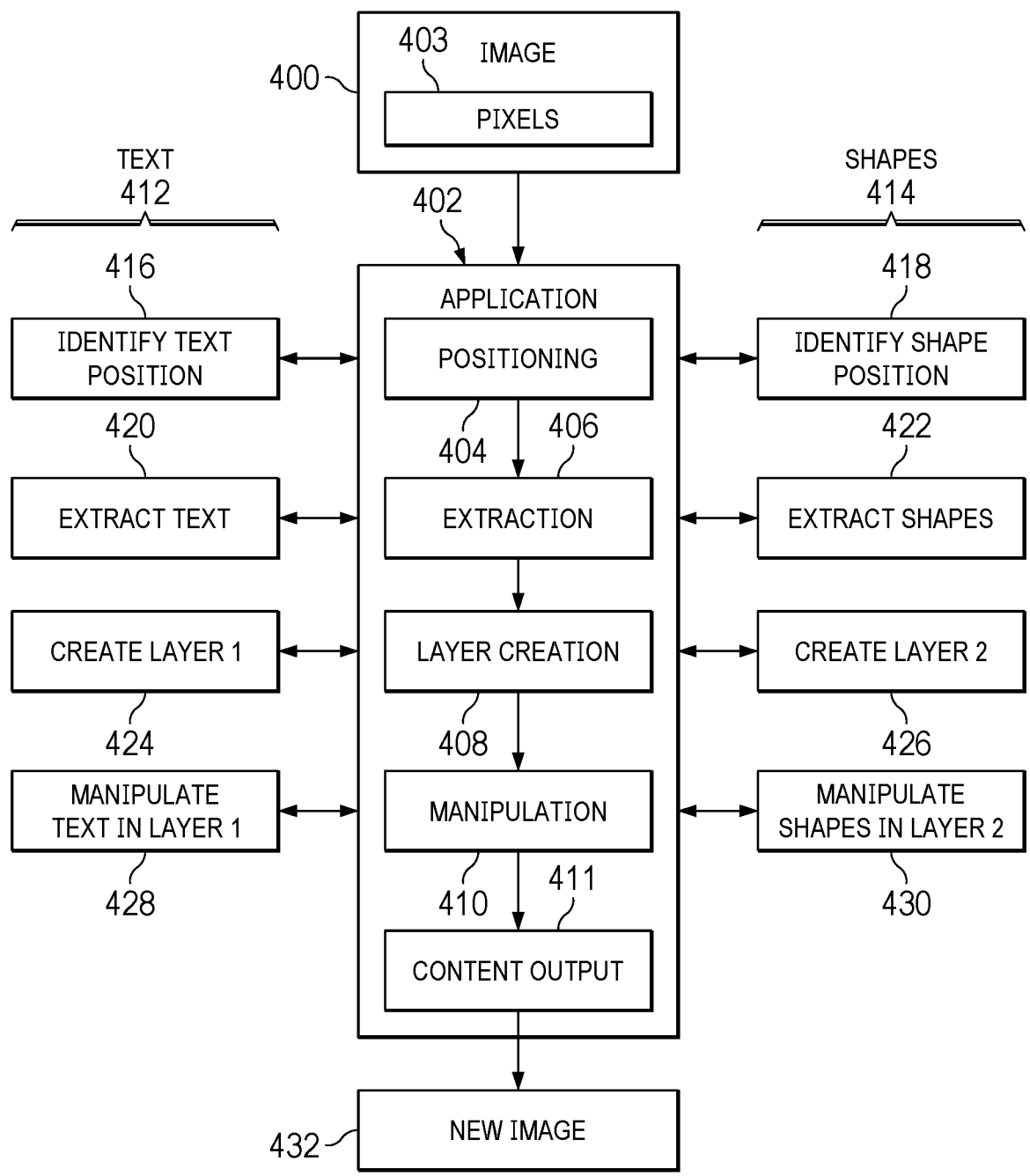
FIG. 4 is block diagram of dataflow for generating a new image from an image comprising pixels in accordance with an illustrative embodiment.

With reference next to FIG. 4, a block diagram of dataflow for generating a new image from an image comprising pixels is depicted in accordance with an illustrative embodiment. As depicted, application 402 receives image 400 for manipulation.

Application 402 comprises components that can place image 400 in a form that is more easily editable or manipulated. In this illustrative example, image manager 306 can be implemented in application 402 to convert image 400 into a more easily editable form. Application 402 can take a number of different forms. For example, application 402 can be a graphic tool, a graphic art program, a web design application, a presentation program, a word processing application, a computer-aided design application, or some other suitable type of application.

Image 400 is a pixel based image and comprises pixels 403. For example, image 400 can be a bitmap, a photograph, a scanned document, or other type of image that is comprised of pixels.

In this illustrative example, application 402 has a number of different components that can manipulate image 400. As depicted, these components include positioning 404, extraction 406, layer creation 408, manipulation 410, and content output 411.

Positioning 404 in application 402 identifies the text position for text 412 within image 400 (block 416). Positioning 404 also identifies shape positions for shapes 414 in image 400 (block 418). These positions can be described using pixel coordinates for image 400. For example, a pixel coordinate can be obtained for the center of each object, such as a character in text 412 for a shape in shapes 414.

In this illustrative example, extraction 406 extracts text 412 (block 420). The extraction of text 412 from image 400 in block 420 results in text data that describes text 412 without using pixels. For example, the extraction of text 412 can result in text data in the form of ASCII codes that identify the characters in text 412 in a machine readable form. Additionally, the extraction of text 412 also results in identifying text attributes for text 412. As a result, text 412 are editable text.

Extraction 406 also extracts shapes 414 (block 422). In block 422, the extraction of shapes 414 results in the generation of shape data in a machine readable form. This shape data can be, for example, vector graphics data. Shapes 414 can be described using vector graphics data such as points, lines, curves, or other graphical elements. Additionally, this extraction also results in identifying shape attributes for shapes 414. As result, shapes 414 are editable shapes.

In this illustrative example, layer creation 408 creates layer 1 (block 424). In this illustrative example, layer 1 comprises text 412 in positions corresponding to the positions of text 412 in image 400. Further, layer creation 408 associates the text attributes with text 412. As a result, a display of layer 1 results in a display of text 412 and the visual appearance of text 412 matches that of text 412 image 400.

Layer creation 408 creates layer 2 (block 426). In this illustrative example, shapes 414 in layer 2 have positions corresponding to the positions of shapes 414 in image 400. Further, layer creation 408 associates shape attributes with shapes 414. Thus, a display of layer 2 results in a visual appearance of shapes 414 that matches shapes 414 in image 400. Thus, layer 1 and layer 2 can be displayed with a visual appearance that looks like image 400.

In this illustrative example, manipulation 410 can display layer 1, layer 2, or both layers in a graphical user interface in response to user input requesting to edit, correct, or otherwise manipulate one or more of these layers.

Manipulation 410 can display at least one of layer 1 or layer 2 in graphical user interface. User input can be received by manipulation 410 to manipulate text 412 in layer 1 (block 428). User input can also be received by manipulation 410 to manipulate shapes 414 in layer 2 (block 430).

The manipulation performed in block 428 can include changing text attributes for text 412. For example, font name, style, size, color, bolding, italics, underlining or other text attributes can be changed. Further, manipulation of characters in text 412 can also be performed. For example, the manipulations performed by manipulation 410 can include copy, paste, delete, or other manipulations of characters.

The manipulation performed in block 430 can include changing shape attributes for shapes 414. For example, a line width, a line style, a line color, a transparency level, a fill color, a fill pattern, an alignment, or other shape attributes can be changed. As another example, the manipulation of shapes 414 can also include inserting a new shape, deleting a shape, modifying a shape, moving a shape, or other types of manipulations.

After one or more manipulations are performed by manipulation 410 in application 402, content output 411 outputs new image 432. New image 432 can be saved for future use and future manipulations. In these illustrative examples, new image 432 can be formed from combining layer 1 and layer 2. In other illustrative examples, the layers can be maintained separately in new image 432.

Further, new image 432 can be manipulated at a future time without needing to reprocess image 400. In these illustrative examples, the manipulations formed by application 402 using manipulation 410 require less effort from the user as compared to image 400 comprising pixels 403.

The description of the different operations in the different blocks performed by the processes in application 402 have been described in a particular order. For example, the processing of text 412 is described before the processing of shapes 414. In other illustrative examples, shapes 414 can be processed prior to processing text 412. As another example, text 412 and shapes 414 can be extracted prior to identifying the position of text 412 and shapes 414.

Figure 5:
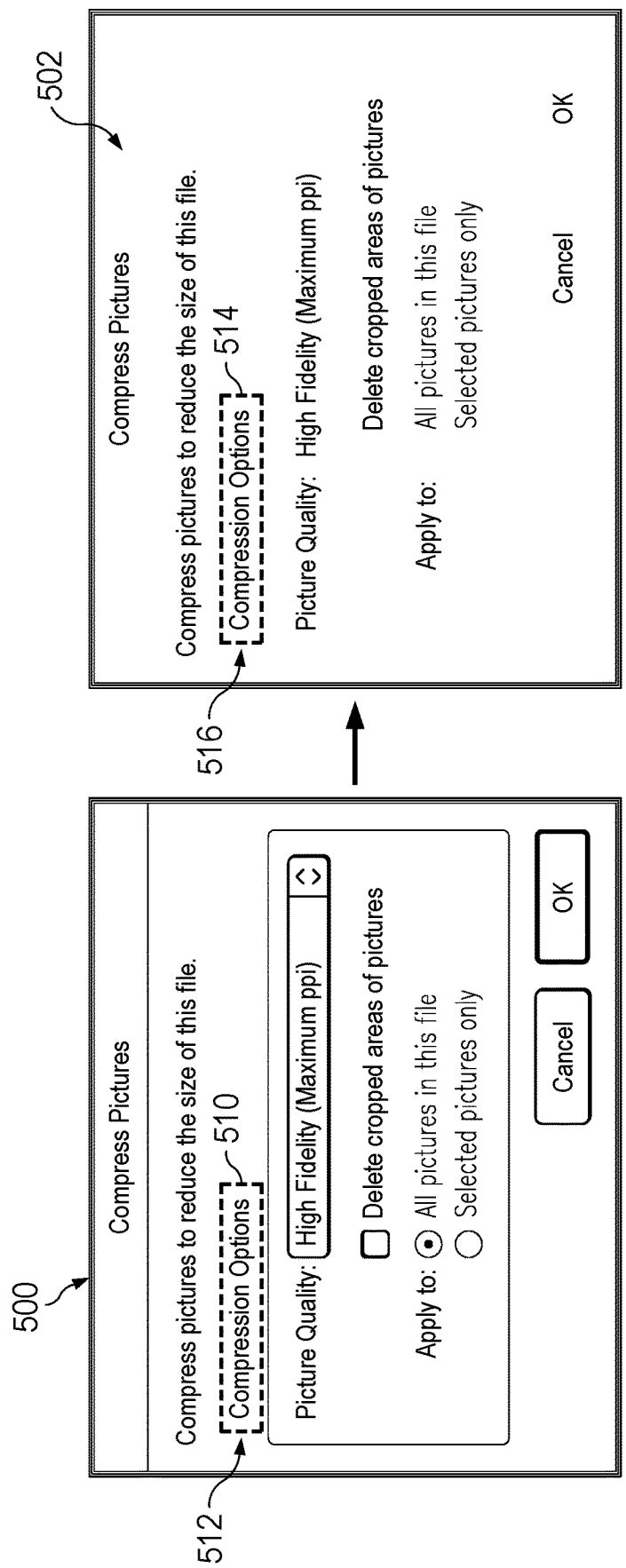
FIG. 5 is an illustration of an image and a text layer in accordance with an illustrative embodiment.
Figure 6:
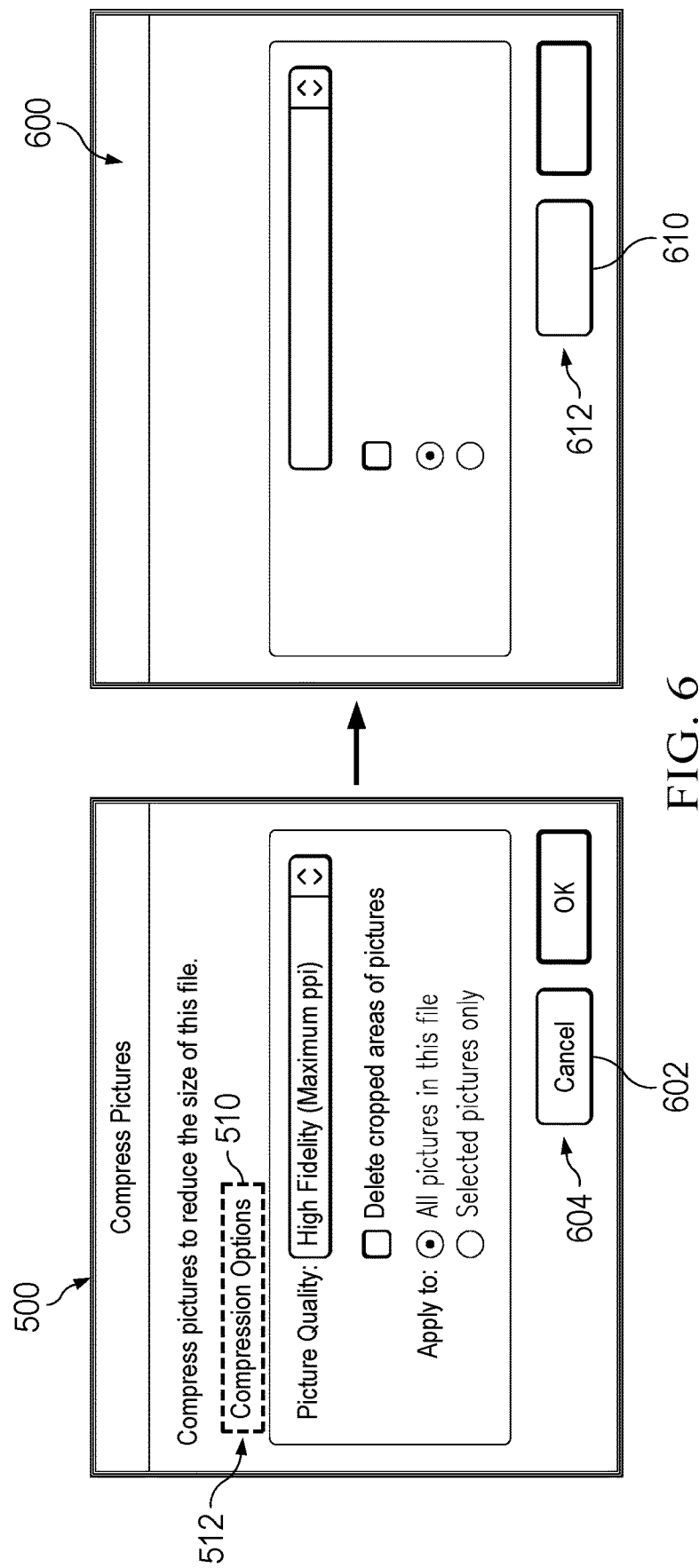
FIG. 6 is an illustration of an image and a shape layer in accordance with an illustrative embodiment.
Figure 7:
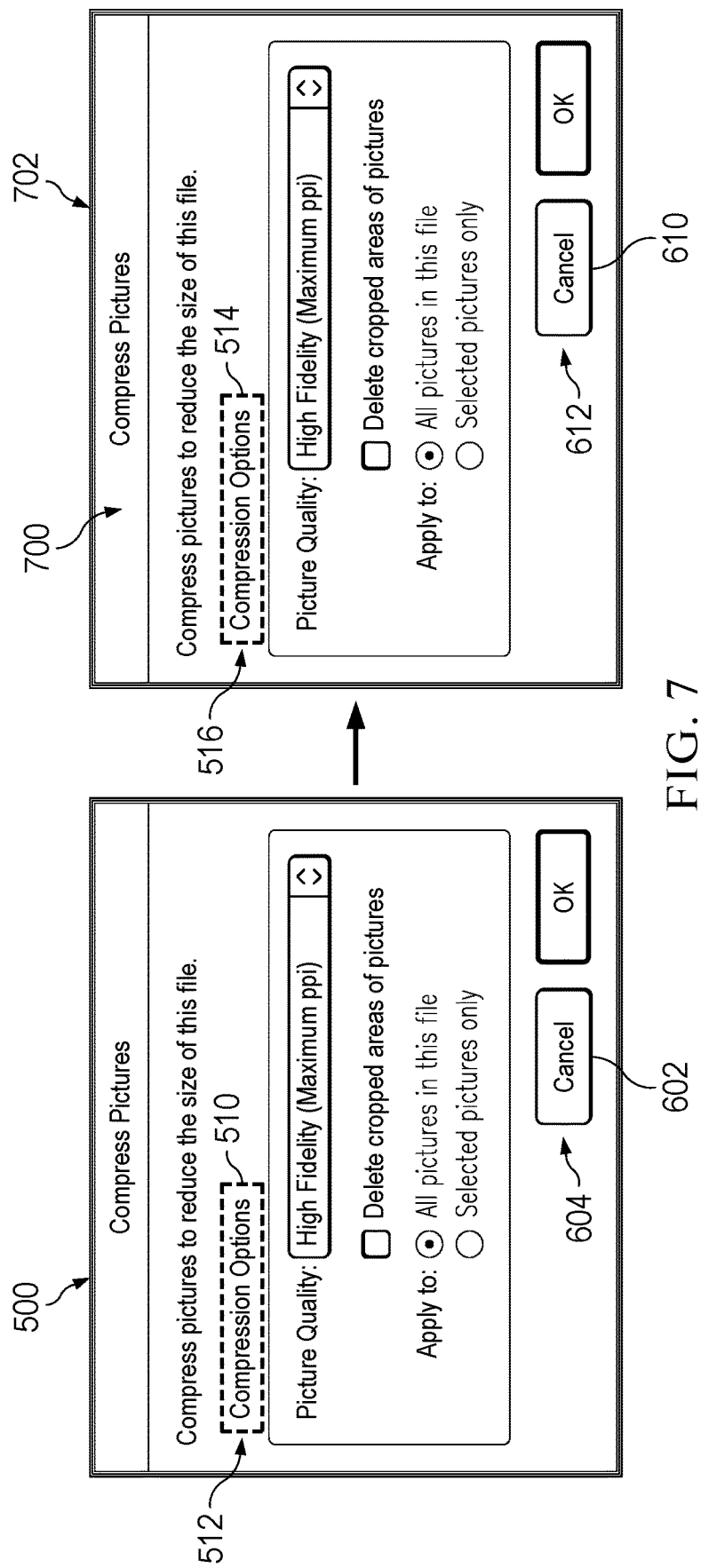
FIG. 7 is an illustration of a new image comprising a combined layer in accordance with an illustrative embodiment.

With reference next to FIGS. 5-7, illustrations of images and layers are depicted in accordance with an illustrative embodiment. These images and layers are examples of images that can be processed by image manager 306 in FIG. 3 and examples of layers that can be created and displayed by image manager 306 in FIG. 3 and displayed on graphical user interface 358 in display system 354 in FIG. 3.

With reference to FIG. 5, an illustration of an image and a text layer is depicted in accordance with an illustrative embodiment. In this illustrative example, image 500 is an example of image 312 in FIG. 3. In this illustrative example, image 500 is a digital image comprising pixels. Text and shapes can be seen within image 500.

In this figure, text layer 502 is created from processing image 500. In this depicted example, text layer 502 has the same dimensions as image 500. In this manner, positions for text in image 500 can be correlated to positions for the corresponding text in text layer 502.

As depicted, text is extracted from image 500 using optical character recognition. Changeable text attributes are generated based on analyzing the pixels for the text in image 500. For example, changeable text attributes can be determined based on pixel color and intensity for pixels defining text in image 500. Further, the position of the text in image 500 is identified. The changeable text attributes in this example can be font name, style, size, and color.

This information is used to create text layer 502. As depicted, the text in text layer 502 has a visual appearance of the text in image 500. For example, text 510 in image 500 in position 512 is "Compression Options". In this illustrative example, position 512 can be the pixel coordinates of the characters for text 510. In another illustrative example, the center of each character in text 510 can be used to identify the position of characters in text 510.

Text 514 is an editable version of text 510 with changeable text attributes and is located in position 516 in text layer 502. Position 512 in image 500 and position 516 in text layer 502 correspond to each other. With text layer 502 having the same dimensions as image 500, a similar coordinate system can be used to position text 514.

As a result, the positioning of text 514 in text layer 502 provides the same visual appearance as text 510 in position 512 in image 500. This same visual appearance can be provided by also using the same text attributes such that the characters in text 514 have the visual appearance of the characters in text 510 in addition to using the corresponding positions.

Turning now to FIG. 6, an illustration of an image and a shape layer is depicted in accordance with an illustrative embodiment. As depicted, shape layer 600 is shown relative to image 500. In this example, shape layer 600 has the same dimensions as image 500. In this manner, positions of shapes identified in image 500 can be correlated to positions in shape layer 600.

In this illustrative example, shapes have been extracted from image 500 and used to create shape layer 600. The shapes are defined using shape data such as vector graphics data. Positions of the shapes in image 500 can be used to position the corresponding editable shapes in shape layer 600. Further, changeable shape attributes are identified and used to display the shapes in shape layer 600. In this depicted example, changeable shape attributes can include line color, line width, and line style.

For example, rounded rectangle 602 is one of the shapes identified in image 500 by analyzing the pixels in image 500 and has position 604 in image 500. Rounded rectangle 610 is located at position 612 in shape layer 600 using the determination of position 604 for rounded rectangle 602 in image 500.

The position of rounded rectangle 610 can be determined in a number of different ways. For example, the position can be based on pixel coordinates for the outline of rounded rectangle 610. In another illustrative example, position can be determined from a location in the center of rounded rectangle 610.

In the illustrative example, this position information is used to provide the same visual appearance for rounded rectangle 610 in shape layer 600 as rounded rectangle 602 in image 500. Rounded rectangle 610 has position 612 in shape layer 600 that corresponds to position 604 of rounded rectangle 602 in image 500. This same visual appearance of rounded rectangle 610 also includes using the same shape attributes such that the rounded rectangle 610 has the visual appearance as rounded rectangle 602 in addition to the corresponding positions.

In FIG. 7, an illustration of a new image comprising a combined layer is depicted in accordance with an illustrative embodiment. In this illustrative example, text layer 502 and shape layer 600 have been combined to form combined layer 700 for new image 702. As depicted, the original look of image 500 is maintained in new image 702. In other words, new image 702 has the same visual appearance as image 500.

Figure 8:
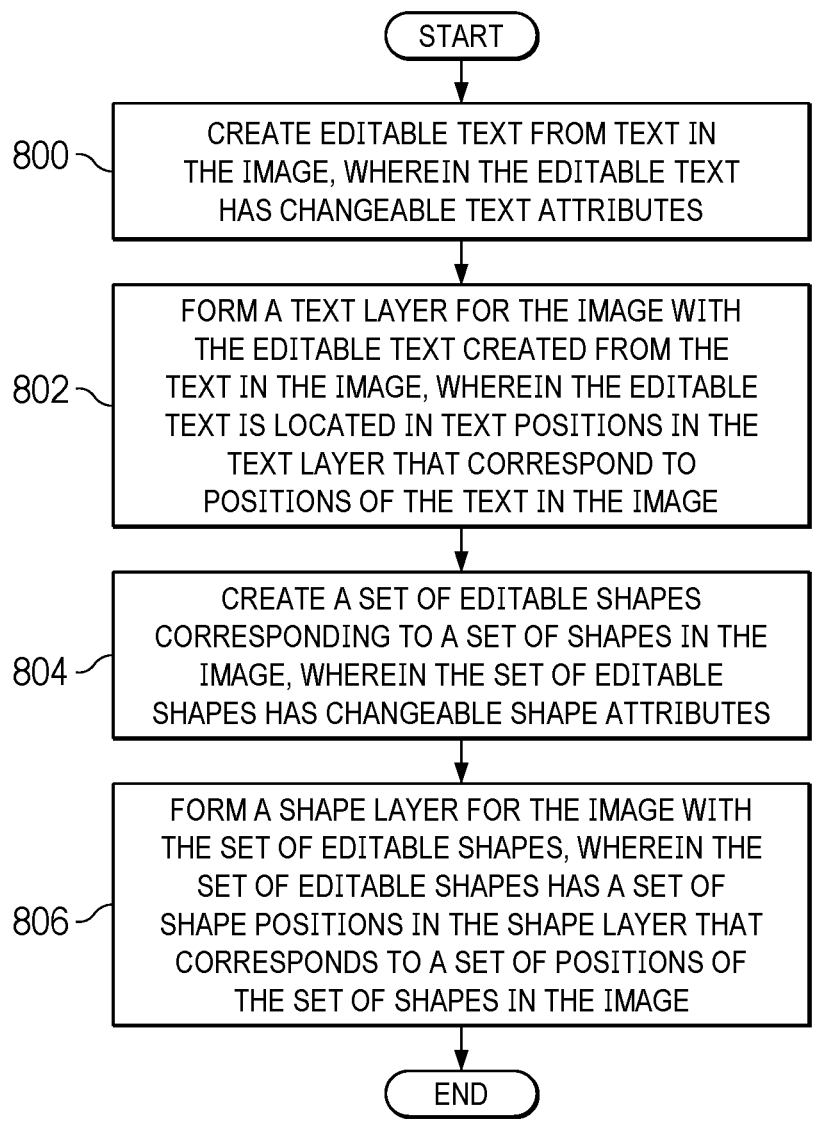
FIG. 8 is a flowchart of a process for creating editable text having changeable text attributes in accordance with an illustrative embodiment.

Turning next to FIG. 8, a flowchart of a process for creating editable text having changeable text attributes is depicted in accordance with an illustrative embodiment. The process in FIG. 8 can be implemented in hardware, software, or both. When implemented in software, the process can take the form of program instructions that is run by one of more processor units located in one or more hardware devices in one or more computer systems. The process illustrated in FIG. 8 can be implemented using image management system 302 in FIG. 3. For example, the process can be implemented in image manager 306 in computer system 304 in image management system 302 in FIG. 3.

The process begins by creating editable text from text in the image, wherein the editable text has changeable text attributes (step 800). The process forms a text layer for the image with the editable text created from the text in the image, wherein the editable text is located in text positions in the text layer that correspond to positions of the text in the image (step 802).

The process creates a set of editable shapes corresponding to a set of shapes in the image, wherein the set of editable shapes has changeable shape attributes (step 804). The process forms a shape layer for the image with the set of editable shapes, wherein the set of editable shapes have a set of shape positions in the shape layer that correspond to a set of positions of the set of shapes in the image (step 806). The process terminates thereafter. The text layer and the shape layer can be displayed in a graphical user interface in a display system.

Figure 9:
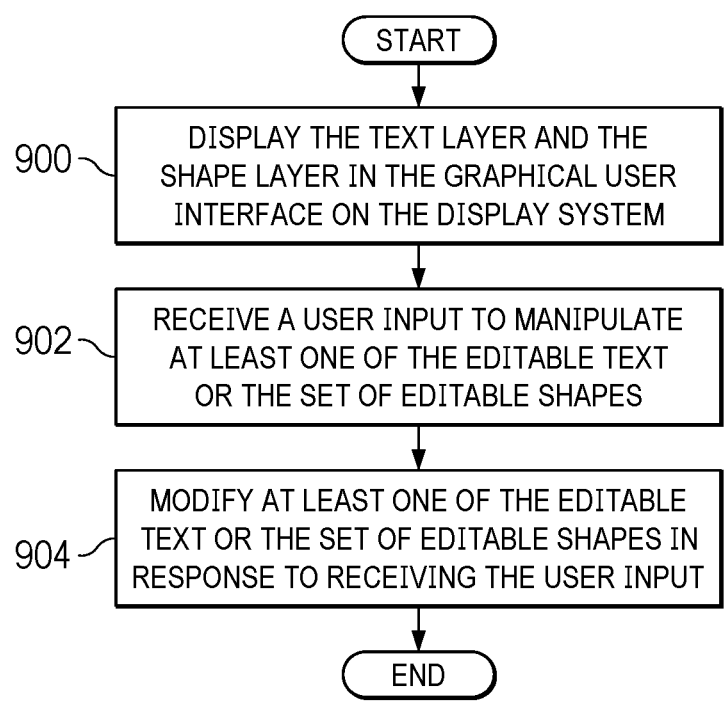
FIG. 9 is a flowchart of a process for manipulating editable text or editable shapes in accordance with an illustrative embodiment.

With reference to FIG. 9, a flowchart of a process for manipulating editable text or editable shapes is depicted in accordance with an illustrative embodiment. The steps in this figure are examples of additional steps that can be used within the operations in the process in FIG. 8.

The process begins by displaying the text layer and the shape layer in the graphical user interface on the display system (step 900). The process receives a user input to manipulate at least one of the editable text or the set of editable shapes (step 902). The process modifies at least one of the editable text or the set of editable shapes in response to receiving the user input (step 904). The process terminates thereafter.

Figure 10:
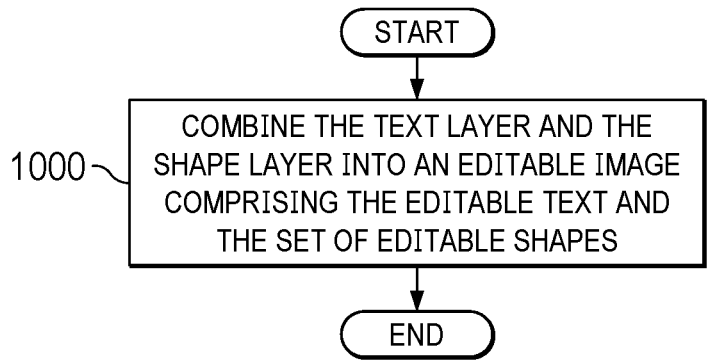
FIG. 10 is a flowchart of a process for combining a text layer and a shape layer into an editable image in accordance with an illustrative embodiment.

With reference to FIG. 10, a flowchart of a process for combining a text layer and a shape layer into an editable image is depicted in accordance with an illustrative embodiment. The steps in this figure are examples of an additional operation that can be used within the steps in the process in FIG. 8.

The process combines the text layer and the shape layer into an editable image comprising the editable text and the set of editable shapes (step 1000). The process terminates thereafter.

Figure 11:
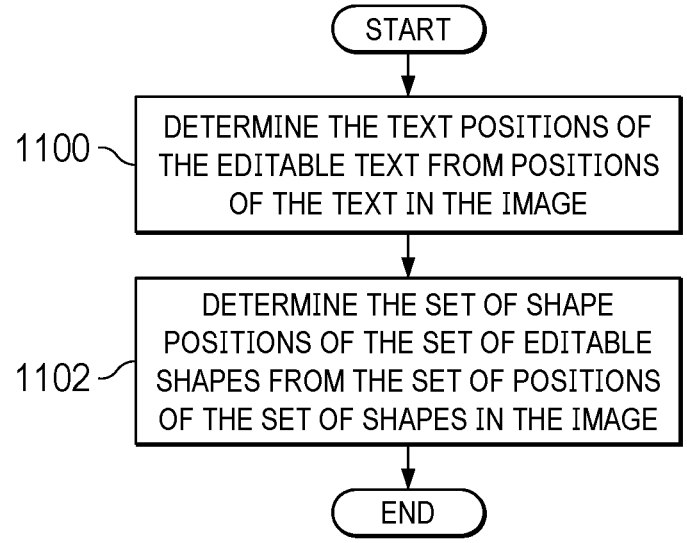
FIG. 11 is a flowchart of a process for determining positions of text and shapes in accordance with an illustrative embodiment.

With reference now to FIG. 11, a flowchart of a process for determining positions of text and shapes is depicted in accordance with an illustrative embodiment. The steps in this figure are examples of additional steps that can be used within the operations in the process in FIG. 8.

The process begins by determining the text positions of the editable text from positions of the text in the image (step 1100). The process determines the set of shape positions of the set of editable shapes from the set of positions of the set of shapes in the image (step 1102).

Figure 12:
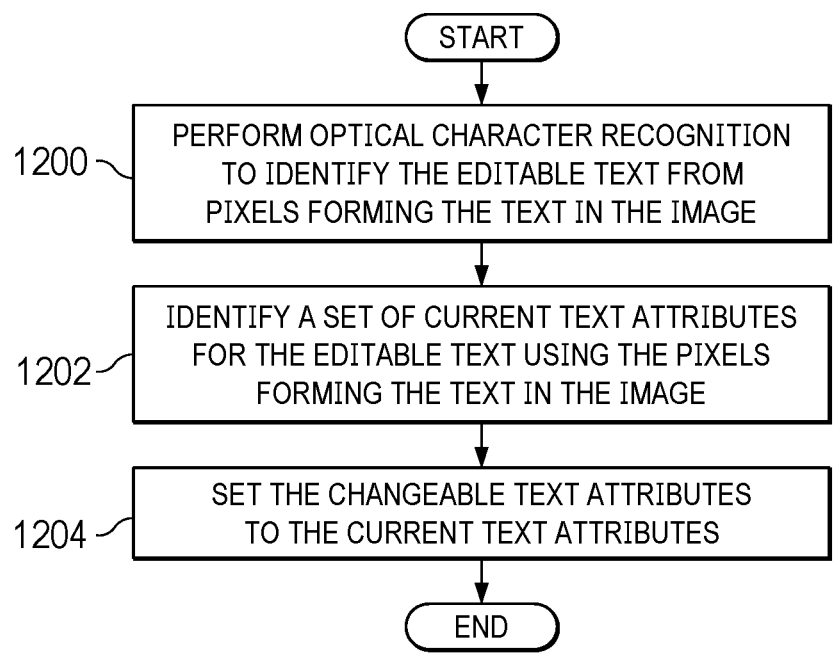
FIG. 12 is a flowchart of a process for creating editable text in accordance with an illustrative embodiment.

Turning next to FIG. 12, an illustration of a flowchart of a process for creating editable text is depicted in accordance with an illustrative embodiment. The process illustrated in FIG. 12 is an example of one implementation for operation 800 in FIG. 8.

The process begins by performing optical character recognition to identify the editable text from pixels forming the text in the image (step 1200). The optical character recognition results in text data such as ASCII codes defining the text recognized in the image. The process identifies a set of current text attributes for the editable text using the pixels forming the text in the image (step 1202). The process sets the changeable text attributes to the current text attributes (step 1204). The process terminates thereafter.

Figure 13:
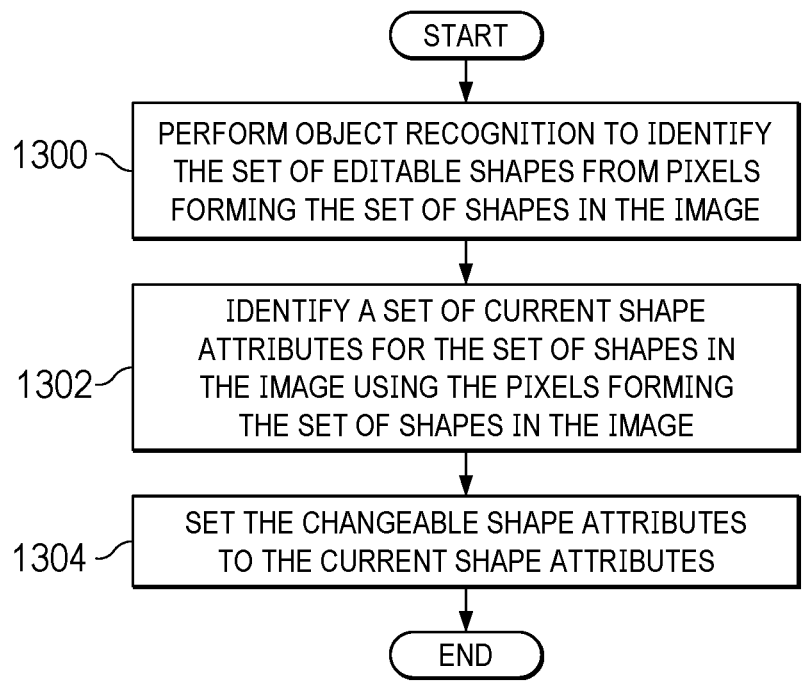
FIG. 13 is a flowchart of a process for creating a set of editable shapes in accordance with an illustrative embodiment.

Turning next to FIG. 13, a flowchart of a process for creating a set of editable shapes is depicted in accordance with an illustrative embodiment. The process illustrated in FIG. 13 is an example of one implementation for operation 804 in FIG. 8.

The process begins by performing object recognition to identify the set of editable shapes from pixels forming the set of shapes in the image (step 1300). In step 1300, the object recognition results in shape data such as vector graphics data defining the shapes in the image.

The process identifies a set of current shape attributes for the set of shapes in the image using the pixels forming the set of shapes in the image (step 1302). The process sets the changeable shape attributes to the current shape attributes (step 1304). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 14:
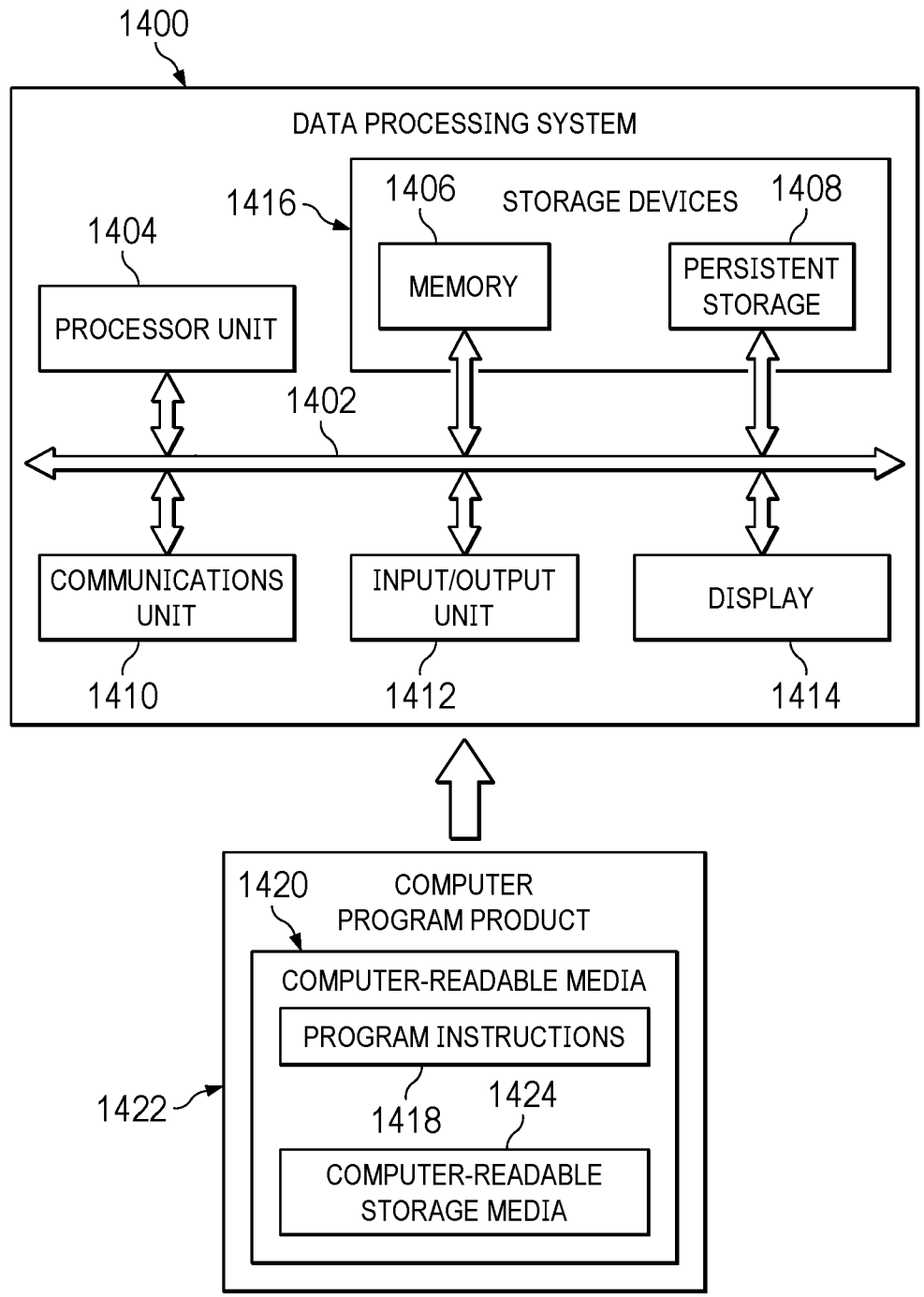
FIG. 14 is a block diagram of a data processing system in accordance with an illustrative embodiment.

Turning now to FIG. 14, a block diagram of a data processing system is depicted in accordance with an illustrative embodiment. Data processing system 1400 can be used to implement server computer 204, server computer 206, client devices 210, in FIG. 2. Data processing system 1400 can also be used to implement computer system 304. In this illustrative example, data processing system 1400 includes communications framework 1402, which provides communications between processor unit 1404, memory 1406, persistent storage 1408, communications unit 1410, input/output unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1404 can may be implemented using one or more heterogeneous processor systems, wherein a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program instructions, computer usable program instructions, or computer-readable program instructions that can be read and executed by a processor in processor unit 1404. The program instructions in the different embodiments can be embodied on different physical or computer-readable storage media, such as memory 1406 or persistent storage 1408.

Program instructions 1418 is located in a functional form on computer-readable media 1420 that is selectively removable and can be loaded onto or transferred to data processing system 1400 for execution by processor unit 1404. Program instructions 1418 and computer-readable media 1420 form computer program product 1422 in these illustrative examples. In the illustrative example, computer-readable media 1420 is computer-readable storage media 1424.

Computer-readable storage media 1424 is a physical or tangible storage device used to store program instructions 1418 rather than a medium that propagates or transmits program instructions 1418. Computer-readable storage media 1424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1418 can be transferred to data processing system 1400 using a computer-readable signal media. The computer-readable signal media are signals and can be, for example, a propagated data signal containing program instructions 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1420" can be singular or plural. For example, program instructions 1418 can be located in computer-readable media 1420 in the form of a single storage device or system. In another example, program instructions 1418 can be located in computer-readable media 1420 that is distributed in multiple data processing systems. In other words, some instructions in program instructions 1418 can be located in one data processing system while other instructions in program instructions 1418 can be located in one data processing system. For example, a portion of program instructions 1418 can be located in computer-readable media 1420 in a server computer while another portion of program instructions 1418 can be located in computer-readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program instructions 1418.

Thus, illustrative embodiments of the present invention provide a computer implemented method, computer system, and computer program product for or manipulating elements in an image such as text and shapes. In one illustrative example, editable text is created from the text in the image. The editable text has changeable text attributes. A text layer is formed for the image with the editable text created from the text in the image. The editable text is located in text positions in the text layer that correspond to positions of the text in the image. A set of editable shapes corresponding to a set of the shapes in the image is created. The set of editable shapes has changeable shape attributes. A shape layer is formed for the image with the set of editable shapes. The set of editable shapes have a set of shape positions in the shape layer that corresponds to a set of positions of the set of shapes in the image. The text layer and the shape layer are displayed in a graphical user interface in a display system in one example.

In the illustrative example, the text layer and the shape layer can be displayed such that these two layers have the same look or visual appearance as the image. Editing of these layers can be performed more easily as compared to pixels in the image.

An image manager in the illustrative example includes processes that can be implemented in applications such as a graphics editor, a web design program, a computer-aided design program, or other types of applications. The new images generated have the same visual appearance as the original image through the positioning process described in the different examples.

Further, in the illustrative example, software user interface screenshots can be converted into images and text editing can be performed on these images. Further, conceptual graphics and schematics can be corrected or updated. In the different illustrative examples, incorrect wording, typographical errors, spelling mistakes, and other issues can be corrected more easily.

Additionally, hazy images can be reused and improved using an illustrative example to create a new image containing editable text and editable shapes. The editable text and the editable shapes can have a sharper look while maintaining the same visual appearance. In other words, the new image does not have to be exact match to the original image comprising pixels. As another example, geographical maps can be updated and re-created. Map text and topographical outlines can be more easily developed in different languages from an original map in one language. Also, searching capabilities can be increased with the use of editable text and editable shapes in the new images as compared to the use of pixels in the original images.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for manipulating an image comprised of pixels, the computer implemented method comprising:

creating, by a group of processor units, editable text from text in the image, wherein the editable text has changeable text attributes;

forming, by the group of processor units, a text layer for the image with the editable text created from the text in the image, wherein the editable text is located in text positions in the text layer that correspond to positions of the text in the image;

creating, by the group of processor units, a set of editable shapes corresponding to a set of shapes in the image, wherein the set of editable shapes has changeable shape attributes; and forming, by the group of processor units, a shape layer for the image with the set of editable shapes, wherein the set of editable shapes have a set of shape positions in the shape layer that correspond to a set of positions of the set of shapes in the image.

2. The computer implemented method of claim 1 further comprising:

displaying, by the group of processor units, the text layer and the shape layer in a graphical user interface on a display system; and receiving, by the group of processor units, a user input to manipulate at least one of the editable text or the set of editable shapes.

3. The computer implemented method of claim 1 further comprising:

combining, by the group of processor units, the text layer and the shape layer into an editable image comprising the editable text and the set of editable shapes.

4. The computer implemented method of claim 3, wherein the editable image has a visual appearance of the image.

5. The computer implemented method of claim 1, further comprising:

determining, by the group of processor units, the text positions of the editable text from positions of the text in the image; and determining, by the group of processor units, the set of shape positions of the set of editable shapes from the set of positions of the set of shapes in the image.

6. The computer implemented method of claim 1, wherein creating, by the group of processor units, the editable text from the text in the image, wherein the editable text has the changeable text attributes comprises:

performing, by the group of processor units, optical character recognition to identify the editable text from the pixels forming the text in the image;

identifying, by the group of processor units, a set of current text attributes for the editable text using the pixels forming the text in the image; and setting, by the group of processor units, the changeable text attributes to the current text attributes.

7. The computer implemented method of claim 1, wherein creating, by the group of processor units, the set of editable shapes corresponding to the set of shapes in the image, wherein the set of editable shapes has the changeable shape attributes comprises:

performing, by the group of processor units, object recognition to identify the set of editable shapes from the pixels forming the set of shapes in the image;

identifying, by the group of processor units, a set of current shape attributes for the set of shapes in the image using the pixels forming the set of shapes in the image; and setting, by the group of processor units, the changeable shape attributes to the current shape attributes.

8. The computer implemented method of claim 1, wherein the changeable text attributes are selected from at least one of a font name, style, size, color, bolding, italics, or underlining.

9. The computer implemented method of claim 1, wherein the changeable shape attributes are selected from at least one of a line width, a line style, a line color, a transparency level, a fill color, a fill pattern, or an alignment.

10. The computer implemented method of claim 1, wherein the changeable text attributes have initial values such the editable text has a visual appearance of the text in the image and wherein the changeable shape attributes have the initial values such the set of editable shapes has the visual appearance of the set of shapes in the image.

11. A computer system comprising:
comprising a group of processor units, wherein the group of processor units executes program instructions to:
create editable text from text in an image comprised of pixels, wherein the editable text has changeable text attributes;
form a text layer for the image with the editable text created from the text in the image, wherein the editable text is located in text positions in the text layer that correspond to positions of the text in the image;
create a set of editable shapes corresponding to a set of shapes in the image, wherein the set of editable shapes has changeable shape attributes; and
form a shape layer for the image with the set of editable shapes, wherein the set of editable shapes have a set of shape positions in the shape layer that correspond to a set of positions of the set of shapes in the image.

12. The computer system of claim 11, wherein the group of processor units executes program instructions to:
display the text layer and the shape layer in a graphical user interface on a display system; and
receive a user input to manipulate at least one of the editable text or the set of editable shapes.

13. The computer system of claim 11, wherein the group of processor units executes program instructions to:
combine the text layer and the shape layer into an editable image comprising the editable text and the set of editable shapes.

14. The computer system of claim 13, wherein the editable image has a visual appearance of the image.

15. The computer system of claim 11, wherein the group of processor units executes program instructions to:
determine the text positions of the editable text from positions of the text in the image; and
determine the set of shape positions of the set of editable shapes from the set of positions of the set of shapes in the image.

16. The computer system of claim 11, wherein the changeable text attributes are selected from at least one of a font name, style, size, color, bolding, italics, or underlining.

17. The computer system of claim 11, wherein the changeable shape attributes are selected from at least one of a line width, a line style, a line color, a transparency level, a fill color, a fill pattern, or an alignment.

18. The computer system of claim 11, wherein the changeable text attributes have initial values such the editable text has a visual appearance of the text in the image and wherein the changeable shape attributes have the initial values such the set of editable shapes has the visual appearance of the shapes in the image.

19. A computer program product for manipulating an image comprised of pixels, the computer program product comprising a computer readable storage medium having program instructions embodied therewith, the program instructions executable by a computer system to cause the computer system to perform a method of:
creating editable text from text in the image, wherein the editable text has changeable text attributes;
forming a text layer for the image with the editable text created from the text in the image, wherein the editable text is located in text positions in the text layer that correspond to positions of the text in the image;
creating a set of editable shapes corresponding to a set of shapes in the image, wherein the set of editable shapes has changeable shape attributes; and
forming a shape layer for the image with the set of editable shapes, wherein the set of editable shapes have a set of shape positions in the shape layer that correspond to a set of positions of the set of shapes in the image.

20. The computer program product of claim 19, further comprising:
displaying the text layer and the shape layer in a graphical user interface on a display system; and
receiving a user input to manipulate at least one of the editable text or the set of editable shapes.

* * * * *